United States Patent
Poddar et al.

(10) Patent No.: US 11,932,319 B2
(45) Date of Patent: Mar. 19, 2024

(54) SYSTEM AND METHOD FOR BALANCING A VEHICLE

(71) Applicants: Vikas Poddar, Mumbai (IN); Ashutosh Upadhyay, Mumbai (IN)

(72) Inventors: Vikas Poddar, Mumbai (IN); Ashutosh Upadhyay, Mumbai (IN)

(*) Notice: Subject to any disclaimer, the term of this patent is extended or adjusted under 35 U.S.C. 154(b) by 0 days.

(21) Appl. No.: 16/957,346

(22) PCT Filed: Apr. 15, 2019

(86) PCT No.: PCT/IN2019/050308
§ 371 (c)(1),
(2) Date: Jun. 23, 2020

(87) PCT Pub. No.: WO2019/198110
PCT Pub. Date: Oct. 17, 2019

(65) Prior Publication Data
US 2020/0331543 A1  Oct. 22, 2020

(30) Foreign Application Priority Data
Apr. 13, 2018 (IN) .............................. 201821002735

(51) Int. Cl.
*B60W 30/02* (2012.01)
*B60W 40/09* (2012.01)
(Continued)

(52) U.S. Cl.
CPC ............. *B62D 37/06* (2013.01); *B60W 30/02* (2013.01); *B60W 40/09* (2013.01); *B60W 50/14* (2013.01);
(Continued)

(58) Field of Classification Search
CPC ..... B62D 37/06; B60W 60/001; B60W 30/02; B60W 40/09; B60W 2040/1315; B60W 2050/146
(Continued)

(56) References Cited

U.S. PATENT DOCUMENTS 5,960,900 A * 10/1999 Cheng ...................... B62M 7/02
180/230
2011/0231085 A1 * 9/2011 Kim ........................ B60L 50/66
701/124
(Continued)

FOREIGN PATENT DOCUMENTS

WO  WO-2018183962 A1 * 10/2018 ............ B60W 40/13
WO  2019198110 A1   10/2019

OTHER PUBLICATIONS

Yetkin et al., Gyroscopic stabilization of an unmanned bicycle, 2014 American Control Conference: 4549-54;615. IEEE. (Year: 2014).*
(Continued)

*Primary Examiner* — Elaine Gort
*Assistant Examiner* — Chanmin Park
(74) *Attorney, Agent, or Firm* — DITTHAVONG, STEINER & MLOTKOWSKI

(57) ABSTRACT

A system, method and a device for balancing a vehicle is provided. In one embodiment the system comprises of a control moment gyroscope. In another embodiment two or more control moment gyroscope may be provided. Further, in an embodiment a mechanism to provide stopping of a precession shaft that links the control moment gyroscope to the vehicle is provided. Furthermore, a user operable switch may be provided in an embodiment to stop precession shaft of the control moment gyroscope.

37 Claims, 4 Drawing Sheets

(51) Int. Cl.
    *B60W 50/14*    (2020.01)
    *B60W 60/00*    (2020.01)
    *B62D 37/06*    (2006.01)
    *B60W 40/13*    (2012.01)
(52) U.S. Cl.
    CPC ... *B60W 60/001* (2020.02); *B60W 2040/1315* (2013.01); *B60W 2050/146* (2013.01)
(58) Field of Classification Search
    USPC .................................... 74/573.1, 572.4, 5 R
    See application file for complete search history.

(56) References Cited

U.S. PATENT DOCUMENTS

| | | | |
|---|---|---|---|
| 2013/0274995 A1* | 10/2013 | Kim | B62J 27/00 701/36 |
| 2015/0143932 A1* | 5/2015 | Igarashi | B62D 37/06 74/5.4 |
| 2017/0043831 A1 | 2/2017 | Zhu | |

OTHER PUBLICATIONS

International Search Report and Written Opinion of the International Searching Authority for related International Patent Application No. PCT/IN2019/050308, dated Jun. 27, 2019, 10 pages.

\* cited by examiner

SYSTEM AND METHOD FOR BALANCING A VEHICLE

CROSS-REFERENCES TO RELATED APPLICATIONS

This application claims priority from PCT Application Serial No. PCT/IN2019/050308, entitled "System and Method for Balancing a Vehicle," filed on Apr. 15, 2019, the contents of which are hereby incorporated herein in their entirety by this reference.

A. TECHNICAL FIELD

The embodiments herein generally relate to balancing a vehicle, and, more particularly, to a vehicle balancing with control moment gyroscope.

B. DESCRIPTION OF THE RELATED ART

Rising energy costs and the impact of greenhouse gases on environment have created a growing need for high efficiency vehicles with a low carbon footprint. Inline-wheeled vehicles, such as motorcycles and scooters, offer higher efficiency than conventional four-wheeled cars.

These are the life-line for most commuters in developing nations, as a two-wheeler provides inexpensive and fast mode of personal mobility. However, two wheelers are inherently unsafe, as even the slightest sideways impact on the vehicle may cause the rider to lose balance and lead to an accident. The two wheelers are very tiring to ride, especially in urban situations since the rider has to balance the vehicle during stop-start situations using his or her feet. Further, some people are not confident of balancing and hence do not use two-wheelers even though the two-wheeler may be one of the most convenient modes of commute.

There have been solutions provided in the prior art using a Control Moment Gyroscope (CMG) to influence the attitude of a vehicle.

The solution in RU2333862(C1) is proposed for cargo handling/robotic uniaxial vehicles and uses gyroscopes and balancing weights. As such the proposed solution may not be deployable or viable in a typical two wheeled vehicle wherein the wheels are not co-axial.

Another solution proposed in US20090183951A1 pertains to utilizing gyroscopic precession as means for inertial propulsion, and is relevant to space applications.

JPH07267577A employs balancing mechanism for control of hung object attitude using gyroscope. This may use an attitude control system having suspended load using a conventional gyroscope. Further, when the suspended load in the turning control is about to collide with the building or the like, it is necessary to rapidly stop the turning of the suspended load in order to avoid the collision.

Here, the device configuration for (brake system or a spin motor system) may be complicated and large, and hence may be inefficient.

U.S. Pat. No. 9,718,504 provides a method for influencing the yaw angle of a motorized two-wheeled vehicle in critical/unstable driving conditions using gyroscopes, and as such does not contribute to the balancing of the vehicle.

The U.S. Pat. No. 8,930,128B2 proposes using modules/logic/circuitry to receive image data identifying terrain, environment, and/or one or more objects near a vehicle, determine a projection of the one or more objects with respect to the vehicle, determine whether the one or more objects will collide with the vehicle, and in response to determining the one or more objects will collide, altering the vehicle state. As per the document, in some embodiments, altering the vehicle state is based, at least in part, on a driver position with respect to the one or more objects determined to collide with the vehicle (e.g., moving the vehicle to protect the drive). As per the document, in some embodiments, altering the vehicle state comprises at least one of adjusting brakes of the vehicle to alter its trajectory, adjusting a steering wheel of the vehicle to alter its trajectory and adjusting an orientation or rotational speed of a flywheel.

Yet another solution for balancing the two-wheeler system has been provided in EP3184406A1. The document proposes, a two-wheel electric vehicle deploying gyroscopes to balance the vehicle every time it is in use.

In yet another solutions proposed in CN103189267B wherein a vehicle is provided comprising: a frame; the frame and coupled to front and rear wheels; a first gyroscope and the second gyroscope of the first gyroscope and the second gyroscope with both the frame is coupled, and aligned with the front and rear wheels, each of said gyroscope comprises a flywheel; a plurality of sensors, a sensor for detecting the orientation of the frame relative to the wheel said frame alignment, orientation and rotation speed of the first gyroscope and the second gyroscope of the flywheel and the speed of the vehicle. Further an electronic control system, said electronic control system provides for at least partially determining an inclination of the vehicle based on at least one of the input data and changing the speed and direction from the plurality of sensors in the vehicle.

The above proposed solutions are automation-heavy and completely depend on the gyroscopic control for vehicle balancing at all speeds. Hence fail-safe mechanisms and redundant devices need to be deployed in order to handle sensor failures, which can be fatal, especially at high vehicle speeds. The redundancies make control more complex and also the overall system costing might increase.

Leveraging the stabilizing ability of CMG is productive at low speeds and at rest. However, at higher speeds and turns, the stabilizing ability of gyroscope becomes counter-productive and interferes with riding experience.

Riding a two-wheeler may be achieved by a complex set of sensorimotor control systems that include sensory input from vision (sight), proprioception (touch), and the vestibular system (motion, equilibrium, spatial orientation); integration of that sensory input; and motor output to the eye and body muscles. Sensory information is sorted out and integrated with information in the brain learned through repeated riding, resulting in automatic movements that lead to the desired riding maneuver. E.g. while negotiating a turn at a particular speed, the rider instinctively applies the right amount of torques to move into the appropriate roll angle.

However, in case of a vehicle fitted with a gyroscope, because there is an internal torque generated by the gyroscope that interferes with the external torques, the riding experience from a user perspective changes significantly as compared to a normal two-wheeler without a gyroscope. Therefore, while the balancing provided by the gyroscope is desirable at low speeds or at rest, it is counter-productive at higher speeds. Further, even if the gyroscope is programmed to calculate and orient the vehicle to the desired roll angles corresponding to various speeds, track curvature etc., interference from the rider due to his/her own natural riding style can be dangerous and even fatal. This is because the final vehicle motion will be a result of the combined effect from the gyroscope as well as the rider maneuvering and could be significantly different as compared to what the rider was intending.

Balancing using gyroscope as described in prior art further requires the use of multiple sensors in the form of absolute angle sensors, steering angle sensor, gyroscope precession velocity sensor etc. Each additional sensor not only increases the cost but also reduces the reliability of the system as an incorrect output of a single sensor may result in undesired actuation of the gyroscope. Such undesired actuation can have terrible effect, especially at high vehicle speeds, as an undesired actuation would lead to the vehicle losing balance and thus leading to a potentially fatal accident. Correspondingly, the cost of the system increases further if fail-safe mechanisms and redundant devices are deployed in order to handle such sensor failures. Further, the method of actuating the gyroscope based on accurate calculation of the desired tilt range and/or accurate counter-torque requires using a precession flywheel thereby increasing the manufacturing cost of the same. Further, in these solutions there is a startup time associated with the system during which the vehicle cannot be used as the vehicle is dependent on the balancing system entirely. This startup wait time may not be acceptable to many users. The startup time is inversely related to the amount of power that may be given to the CMG during the startup phase, and hence in order to reduce the startup time the motor driving the CMG needs to be more powerful, thereby increasing the cost and the weight of the system.

Accordingly, there remains need for a system and method for balancing a vehicle with cost-effective, user friendly and reliable mechanism.

SUMMARY

A system and method for balancing a vehicle is provided. Further, a wheeled vehicle with at least two wheels is also provided. The system for balancing a vehicle comprises, at least one control moment gyroscope, having at least one flywheel rotatable in a first direction around a flywheel shaft, said at least one flywheel coupled to a precession shaft and configured to generate a precession-torque along a roll axis of the vehicle. Further, at least one stopper device coupled to the precession shaft, operable to stop the rotation of the precession shaft around a precession axis that runs along the precession shaft is provided.

In one embodiment, the stopper device is an electromechanical unit configured to engage with the precession shaft to stop the rotation of the precession shaft upon actuation of the said at least one stopper device. In another embodiment, electronic, hydraulic system may be used as well.

In one embodiment, the system for balancing a vehicle also comprises a flywheel-position sensor coupled to the precession shaft to measure a precession angle of said at least one flywheel, an attitude sensor configured to measure changes in an attitude of the vehicle, a precession motor coupled to the precession shaft and operable to generate an actuation-torque along the precession axis, a control unit configured to operate the precession motor based at least upon, the precession angle of said at least one flywheel, and the attitude of the vehicle received from the attitude sensor.

Further, a vehicular-velocity sensor may be provided configured to measure a velocity of the vehicle. The control unit may be further configured to engage the stopper device when the velocity of the vehicle is above a threshold vehicular-velocity value and to disengage the stopper device when the velocity of the vehicle is below a threshold vehicular-velocity value. In one embodiment, the threshold vehicular-velocity value for engaging might be different than the threshold vehicular-velocity value for disengaging.

In one embodiment more than one control moment gyroscopes may be provided. In such scenario another flywheel rotatable in a second direction opposite to the first direction, around another flywheel shaft is provided. This other flywheel is coupled to another precession shaft. The precession motor may be coupled to the precession shaft and also to another precession shaft.

Further, in one embodiment the flywheel position sensor is configured to measure the precession angle of said at least one flywheel and said another flywheel, the flywheel-position sensor being coupled to said at least one precession shaft or said another precession shaft.

Further in one embodiment, a second precession motor coupled to the other precession shaft is provided. The second precession motor is operable to generate precession-torque along another precession shaft. A separate second flywheel-position sensor coupled to the other precession shaft to measure a precession angle of said another flywheel may also be provided.

A user input switch for operating the stopper device based on an action from user is also provided allowing user the flexibility of engaging or disengaging the balancing system when desired.

While the stopper device is engaged hence locking the precession shaft, impact may still be detected based on the attitude sensor output, and disengage the stopper device. This stopper device may be integrated into the precession motor.

In one embodiment, flywheel shaft and the flywheel are integrated into a single unit. Further, the flywheel-position sensor is integrated into the precession motor.

In a scenario where the system is fitted into a vehicle having a control unit beforehand responsible for other functions of the vehicle, the control unit as per embodiments herein may be integrated into such control unit that was present in the vehicle beforehand. Autonomous and remote operation capabilities may be provided to the control unit in yet another embodiment.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. The embodiments herein will be better understood from the following detailed description with reference to the drawings, in which.

DETAILED DESCRIPTION OF PREFERRED EMBODIMENTS

A system, method for balancing a vehicle is provided. In one embodiment the system comprises of a control moment gyroscope. In another embodiment two or more control moment gyroscope may be provided.

Further, in an embodiment a mechanism to provide stopping of a precession shaft that links the control moment gyroscope to the vehicle is provided. Furthermore, a user operable switch may be provided in an embodiment to stop precession shaft of the control moment gyroscope.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Reference in the specification to "one embodiment" or "an embodiment" means that a particular feature, structure, characteristic, or function described in connection with the embodiment is included in at least one embodiment of the invention. The appearances of the phrase "in one embodiment" in various places in the specification are not necessarily all referring to the same embodiment. Further, the use of "measurement" is not necessarily limited to a single act of measurement or reading but may refer to multiple such instances or readings. The headings and subheadings used in the document are not intended to limit the content therein to respective heading or subheading. Rather, they are used to help reader navigate and prevent obscuring the invention.

Figure 1:
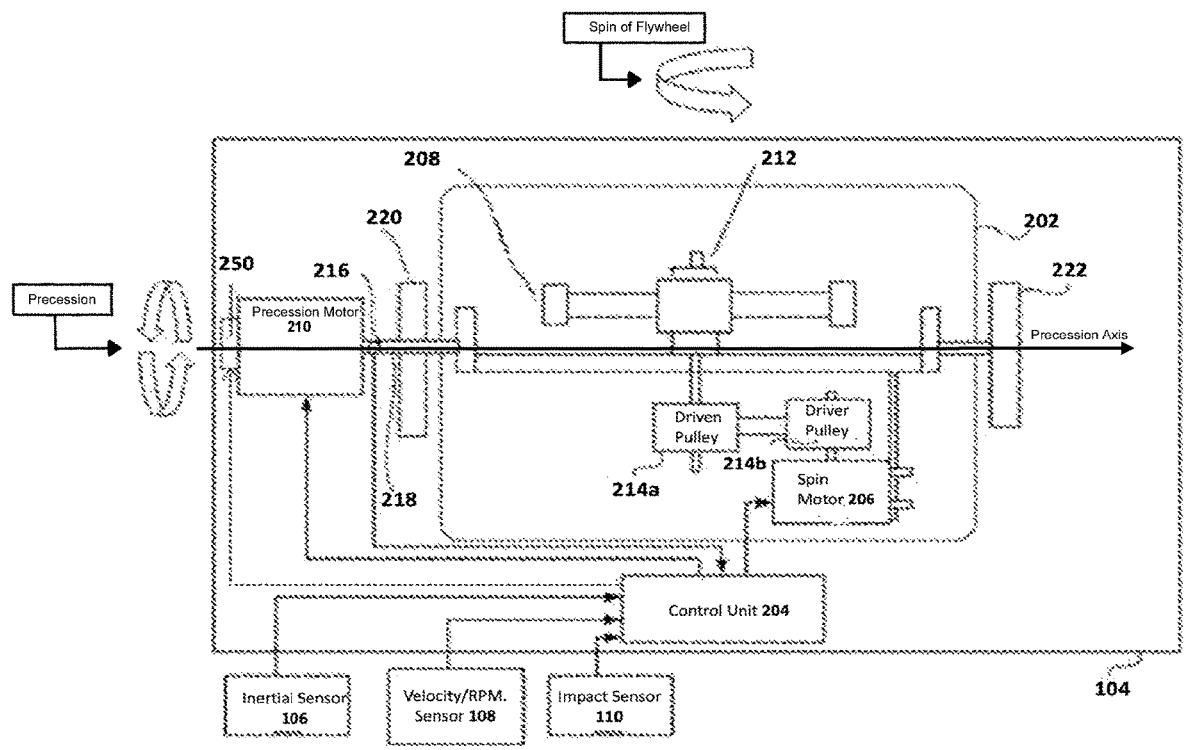
FIG. 1 illustrates a schematic view of a system for balancing a vehicle as per an embodiment herein.

FIG. 1 illustrates a schematic view of a system 100 for balancing a vehicle according to an embodiment herein. In one embodiment herein, a control moment gyroscope 202 may be provided, having a precession shaft 218 that may have a flywheel coupled thereto. The control moment gyroscope may contribute in balancing the vehicle where it may be installed. In another embodiment more than one control moment gyroscope may be provided. Further, a stopper device 250 may be provided coupled to the precession shaft that when signaled as such engages the precession shaft to stop the rotation of the precession shaft. In one embodiment, the stopper device may be realized using electromechanical parts. Some examples may include electromagnetic mechanism, electric mechanism, friction mechanism, hydraulic mechanism, servo mechanisms, pneumatic/air mechanism, vacuum mechanism. Further, designs of such stopper mechanisms may include a disc or a drum brake.

In one embodiment the control moment gyroscope may comprise of a flywheel 208 rotating around a flywheel shaft 212. The flywheel may rotate in a first direction which may be clockwise or anticlockwise. A means for rotating the flywheel may be provided in form of a spin motor 206. The spin motor 206 may spin the flywheel either directly or through one or more pulley system that may further comprise of a driven pulley 214a and a driver pulley 214b. When spinning the flywheel directly, the spin motor may be mounted directly on the flywheel shaft 212 or be integrated with the flywheel shaft. The flywheel, flywheel shaft and the spin motor may be integrated into one unit as well. For the flywheel to operate as intended there may be a velocity of rotation defined. This threshold flywheel-spin-velocity may vary depending on various factors including the weight of the flywheel and vehicle, including others.

The desired threshold flywheel-spin-velocity may be calculated based on required maximum precession-torque that aids to the balancing of the vehicle, flywheel moment of inertia and maximum precession velocity. For one exemplary embodiment following calculation may apply. A vehicle of 150 KG carrying 2 riders of 75 Kg each is required to Balance itself up-to tilt angles of 5 degree. If the center of mass of vehicle is located 0.75 meters from the ground, the required precession-torque that aids to the balancing of the vehicle may be approximated as=>(150+150)*9.8*0.75*sin(5 degree)=192 NM. If the flywheel has moment of inertia of 0.15 kg m2, and the maximum possible precession velocity is 5 radian/sec then the desired threshold flywheel-spin-velocity may be −192/0.15/5=256 Radian/sec. (2448 RPM).

In one embodiment, a precession motor 210 may be provided coupled to the precession shaft and operable to generate an actuation-torque along the precession axis. In one embodiment, the precession motor may be coupled to the precession shaft 218 directly. In another embodiment the precession motor 210 may drive the precession shaft 218 through a separate belt or gear drive. In one embodiment, the flywheel 208 may be enclosed within a flywheel housing as an additional safety measure.

Further, an attitude sensor may be provided. The attitude sensor also referred to as IMU or inertial sensor may be configured to measure changes in attitude of the vehicle.

In one embodiment a flywheel-position sensor 216 may be coupled to the precession shaft 218 to obtain a precession angle (a) of the flywheel 208. In one embodiment, the flywheel-position sensor 216 may be integrated in the precession motor 210 itself. In some embodiments, multiple flywheels may be present (as described further in the document). In such scenarios, the flywheel-position sensor may provide the precession angle of each of the flywheel. Alternatively, a second flywheel-position sensor may be provided coupled directly to another precession shaft that may be coupled to another flywheel.

In one embodiment, the stopper device 250 may be mounted on the gyroscope frame 220 and is coupled to the precession shaft 218. The stopper device 250 may lock or unlock the precession shaft 218 in position depending on the control signal from the control unit 204. In another embodiment the stopper device 250 may be integrated with the precession motor 210. The control unit may be configured to operate the precession motor based upon, the precession angle of the flywheel, and the attitude of the vehicle received from the attitude sensor. The control unit may take account of other inputs such as the velocity of the vehicle and user input. In one embodiment a separate impact sensor 110 may also be provided that provides impact data to the control unit to allow the control unit to operate the stopper device. In another embodiment, a user input switch may be provided to directly operate the stopper device.

In one embodiment the system for balancing a vehicle may include more than one gyroscope units, such that their individual precession-torque generating capabilities around the roll axis are added to result in the cumulative precession-torque generated by the vehicle balancing system 100.

Figure 2:
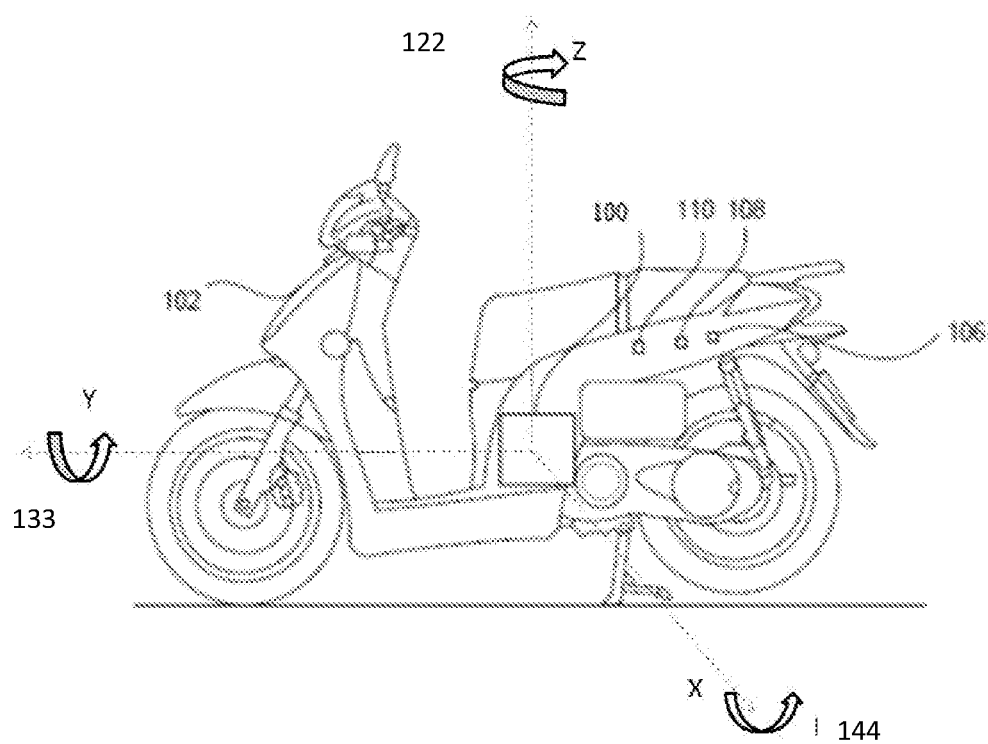
FIG. 2 illustrates a vehicle having the system for balancing as per an embodiment herein.

Further, in case of a two gyroscope system, wherein two flywheels with equal inertia are rotating at the same spin velocity but in opposite direction, the resultant torques because of the roll motion of the vehicle $\omega_{roll}$ are equal and opposite in direction, and hence cancel out. The net torque on the vehicle because of the roll motion when the stopper is engaged may therefore be zero FIG. 2 illustrates a vehicle having the system for balancing as per an embodiment herein. The working of which may be better understood with reference to FIG. 1 along with FIG. 2. Also, various axes for yaw 122, roll 133 and pitch 144 rotations have been shown. The vehicle 102 may have a vehicle balancing system 100 installed therein. An attitude sensor 106, a vehicular-velocity sensor 108 and an impact sensor 110 may form part of the vehicle balancing system. In an embodiment, the attitude sensor may also sense the vehicular-velocity of the vehicle 102. In one embodiment, the attitude sensor 106 also measures vehicle's linear acceleration. The vehicle balancing system 100 may derive the velocity of the vehicle 102 from at least one of (i) the attitude sensor 106 or (ii) the vehicular-velocity sensor 108. The system may further include a flywheel-position sensor. The flywheel-position sensor may obtain a precession angle ($\alpha$) of the flywheel. The positions of various components shown in FIG. 2 are exemplary and may vary. For example, various components such as attitude sensor 106, a vehicular-velocity sensor 108 and an impact sensor 110 may be placed with or within the vehicle balancing system 108 in an integrated form.

The vehicle balancing system 100 may be configured to be activated for providing precession-torque that aids to the balancing of the vehicle 102 when the flywheel-spin-velocity crosses the predetermined threshold flywheel-spin-velocity (Wsth).

In an exemplary embodiment, various forces acting may be explained as follows:

The effective precession-torque that aids to the balancing of the vehicle generated by a Control Moment Gyroscope (CMG) unit may be approximated as $$\tau = I * Ws * Wp * \cos \alpha$$

Where, I is moment of inertia of the flywheel about the spin axis, Ws is Spin Angular velocity of a disc, Wp is the precession Angular velocity of the disc, $\alpha$ is the Angle of precession of the disc. In another embodiment, the W sin may be chosen such that the vehicle balancing system 100 includes enough counter-torque generating capability for desired operating conditions. During this startup phase the vehicle 102 may still be used by a user/rider, while the balancing has to be done by the user or the rider himself using his/her feet.

In one embodiment, the vehicle may include self-balancing capabilities which come into operation based on some conditions. For example, in one embodiment the self-balancing capability may operate while the vehicular-velocity is below a threshold vehicular-velocity.

In one embodiment, the vehicle balancing system 100 may be deactivated by engaging the stopper device, when velocity of the vehicle 102 exceeds a predetermined velocity: a threshold vehicular-velocity $V_{th}$. In another embodiment, when the velocity of the vehicle 102 exceeds the predetermined velocity $V_{th}$, the precession angle ($\alpha$) may be slowly brought to zero before the vehicle balancing system 100 is deactivated.

The flywheel possesses a natural tendency to precess around a precession axis when there are any changes in the attitude of the vehicle 102 and consequently to that of the flywheel. In an exemplary embodiment having the system for balancing installed in a two-wheeler, a gyroscope, would typically resist any change in its roll angle. This may be due to any external torque acting upon the vehicle, such as that due to gravity, may be spent at least in part in changing the angular momentum of the flywheel, i.e. causing the flywheel to precess about the precession axis. If, however, this degree of freedom is removed, the resultant roll motion will instead result in an orthogonal torque being generated by the flywheel, which in turn gets passed to the vehicle. Since, this resultant torque is orthogonal to the roll motion, it may not interfere with the rider's own maneuvers.

This may be understood better with following exemplary embodiment:

Consider the following gyroscope configuration:
Mass of the flywheel: 8 kg
Diameter of the flywheel: 25 cm
Flywheel Spin rpm: 8000 rpm
Considering a very high roll velocity, $\omega_{roll}$ of 180 degrees/sec, the orthogonal torque $\tau$ would be calculated to be about 160 Nm generated along the pitch axis. Depending on the direction of the roll velocity this torque may result in an increase in the ground reactionary force on the front wheel or the rear wheel. Considering a vehicle with a total weight of 300 kg and a wheelbase of 1300 cm. In an exemplary scenario the rear wheel may feel a reactionary force. Assuming equal weight distribution between front and rear wheels, the moment exerted by the ground reactionary force on the front wheel would be about 1900 Nm. Since the torque due to pitch moment is significantly less than 1900 Nm, the front wheel may not lose contact with the ground in typical scenarios. The moment exerted because of the gyroscope may therefore be insignificant as compared to the normal moment because of the vehicle's own weight and may thus not have a noticeable effect on the handling of the vehicle.

Further, in case of a two gyroscope system, wherein two flywheels with equal inertia are rotating at the same spin velocity but in opposite direction, the resultant torques because of the roll motion of the vehicle $\omega_{roll}$ are equal and opposite in direction, and hence may cancel out. The net torque on the vehicle because of the roll motion when the stopper is engaged may therefore be zero.

In various embodiments herein, the vehicle balancing system 100 may be deactivated by ensuring the flywheel is not allowed to precess in either direction around the precession axis. In one embodiment, this is achieved by locking the precession shaft in position through the stopper device (not seen in FIG. 2) which is activated or deactivated depending on a control signal obtained from a control unit. The control unit depending on whether the balancing system 100 needs to be activated or deactivated allows or prevents the precession shaft from rotating about the precession axis. In the abovementioned scenario, the orthogonal torque of 160 Nm is passed through the stopper device 250 to the frame of the vehicle. In one embodiment, the stopper device may be coupled to the precession shaft through a gear mechanism so that the holding torque required for the locking unit, and hence the power requirement for the same, will be considerably lower.

In one embodiment, sideways impact to the vehicle 102 may be continuously sensed by at least one of (i) the attitude sensor 106 or (ii) the impact sensor 110 even when the vehicle balancing system 100 may be deactivated. The vehicle balancing system 100 may immediately be reactivated when a sideways impacted is sensed by at least one of (i) the attitude sensor 106 or (ii) the impact sensor 110.

In another embodiment, sudden changes in yaw or roll rates of the vehicle 102 may be sensed by at least one of (i) the attitude sensor 106 senses or the impact sensor 110. A sudden and significant change in the yaw or roll rates of the vehicle 102 may be due to, but not limited to an accident, or a sudden loss in balance of the vehicle 102 (e.g. in case of skidding). The vehicle balancing system 100 may be immediately reactivated upon sensing such a sudden and significant change.

The vehicle balancing system 100 may provide for actuating a precession motor through a motor controller to provide torque along the precession axis. This may result in a torque being generated about the roll axis due to the gyroscopic properties of the flywheel, which gets transferred to the vehicle 102 through a gyroscope frame 220. A dynamic equilibrium between the precession angle ($\alpha$) and the relative change in the vehicle's roll velocity may be attained by controlling at least one of the degree, direction or timing of the actuation provided to the precession motor.

The vehicle balancing system 100 may be configured to resist the vehicle 102 from falling even in case of impacts or skidding depending on the torque generating capability of the Control Moment Gyroscope, by thus either preventing the fall altogether or greatly reducing the effect of the impact. In one embodiment, state of the vehicle balancing system 100 (e.g. activated/deactivated, the precession angle ($\alpha$), the flywheel-spin-velocity, etc.) is communicated to the user or the rider by displaying the state on the vehicle's dashboard. In another embodiment, a bypass control of the activation/deactivation of the vehicle balancing system 100 is given to the rider or the user through a user operated switch. In yet another embodiment, the rider or the user may choose to deactivate the vehicle balancing system 100 even at low speeds and manually balance the vehicle 102.

In one embodiment, the gyroscope frame 220 may be mounted on the vehicle's frame such that the flywheel shaft 212 when the vehicle balancing system 100 is not operational is either parallel to the vehicle's rear wheel (the flywheel 208 is in horizontal position), or it is perpendicular to the vehicle's rear wheel (the flywheel 208 is in vertical position). In one embodiment, the attitude sensor 106, the vehicular-velocity sensor 108, the impact sensor 110, the control unit 204 are mounted separately on the vehicle 102 as per manufacturers preference or design efficiencies.

In one embodiment, the vehicle may be provided with a control unit configured to receive input remotely for operating the vehicle. A wireless receiving unit may be installed in the vehicle 102 in order to receive such remote instructions from a user or a server in a remote location. In another embodiment, the control unit may be provided with onboard intelligence to operate autonomously. This may be provided by having a processing unit in the control unit for providing inputs as that provided by a human user.

Figure 3:
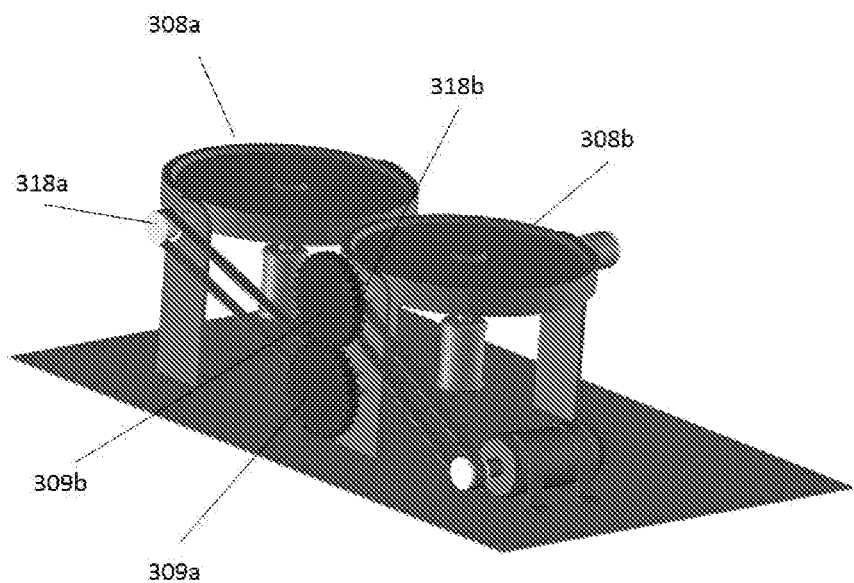
FIG. 3 illustrates an isometric view of two-gyroscopes present in a system for balancing a vehicle as per an embodiment herein.

FIG. 3 illustrates an isometric view of two-gyroscopes implementation present in a system for balancing a vehicle as per an embodiment herein. A flywheel 308a may be provided coupled to a precession shaft 318a. While another flywheel 308b may be provided coupled to another precession shaft 318b. A gear 309a may be provided coupled directly to the gear 309b such that their directions of rotation are opposite. The gear 309b may further be coupled using a belt and a gear arrangement with the precession shaft 318b of the flywheel 308b. In this exemplary implementation the precession motor may be connected using a belt and gear system. However, in another embodiment the precession motor may be directly coupled with the precession shaft 318a or the precession shaft 318b.

Figure 4:
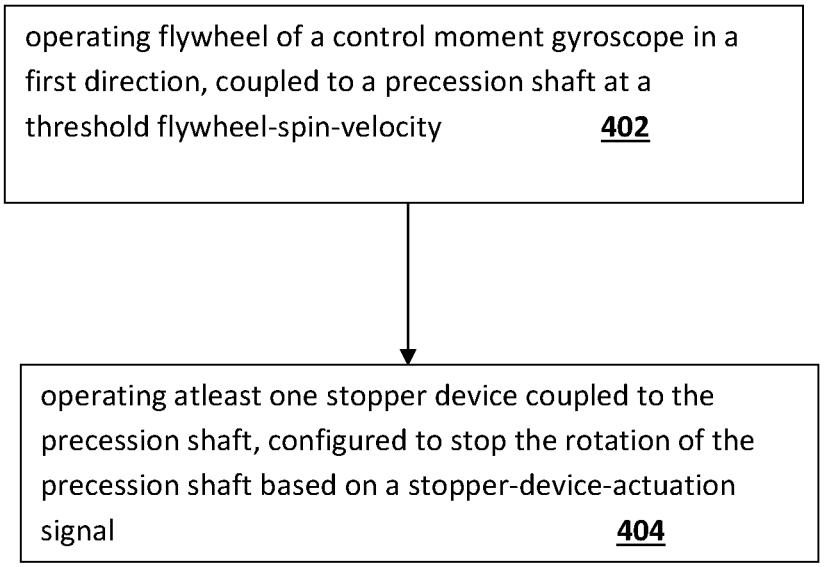
FIG. 4 illustrates a flow diagram of a method of balancing a vehicle according to an embodiment herein.

FIG. 4 illustrates the method for balancing a vehicle as per an embodiment herein. The method comprises of operating flywheel of a control moment gyroscope in a first direction, coupled to a precession shaft at a threshold flywheel-spin-velocity. Feature may be provided that the user may not be allowed to ride unless the flywheel-spin-velocity has been achieved. In another scenario, the user may start riding the vehicle even while the flywheel may not have reached the flywheel-spin-velocity threshold.

The method provides for operating at least one stopper device coupled to the precession shaft. Such operation may effectively be configured to stop the rotation of the precession shaft based on a stopper-device-actuation signal. The stopper-device-actuation signal may be received from a control unit. Alternatively, such signal may be received directly from a user. This may be signaled using a user operated switch.

While the vehicle is switched on the method may provide for periodically obtaining an attitude of the vehicle. The attitude measurements may include specific force measurements, angular rate measurement, velocity measurements etc. Further, a periodic obtaining a precession angle of said at least one flywheel takes place. Based on the above inputs a precession motor may be operated.

When the velocity of the vehicle is above a threshold vehicular-velocity value a stopper-device-actuation signal may be generated for the stopper device. This engages the stopper device. While the velocity of the vehicle is below a threshold vehicular-velocity value the stopper-device-actuation signal may be degenerated. This would lead to disengaging the stopper device. This ensures a user is able to receive assistance of the vehicular balancing system. In one embodiment, the threshold vehicular-velocity value for engaging might be different than the threshold vehicular-velocity value for disengaging. In an embodiment the vehicular-acceleration, vehicular-deceleration, or angular velocities may also be factored for the generation/degeneration of the stopper-device-actuation signal.

In an embodiment, the method may also provide for generating the stopper-device-actuation signal to engage the stopper device upon receiving a user input. Further, degenerating of the stopper-device-actuation signal may be provided to disengage the stopper device upon receiving a user input. This allows flexibility on the part of a user to use or halt the use of balancing system depending on the practical need he or she encounters.

In another embodiment, the method provides for operating another flywheel of another control moment gyroscope in a second direction that is opposite to the first direction. As explained earlier this causes the two flywheel's individual torque generating capabilities around the roll axis to be added to result in the cumulative torque generated by the vehicle balancing system 100. Further, in case of a two gyroscope system, wherein two flywheels with equal inertia are rotating at the same spin velocity but in opposite direction, the resultant torques because of the roll motion of the vehicle $\omega_{roll}$ are equal and opposite in direction, and hence may cancel out. The net torque on the vehicle because of the roll motion when the stopper is engaged may therefore be zero.

The system and method thus provides for assistance to a user in balancing the vehicle for situations needing such assistance the most. In doing so the need for excessive equipment and sensor may be minimized while achieving desired result of balancing a vehicle with cost-effective, user friendly and reliable mechanism. Further, the system and method herein act to adapt to the user by supplementing the user actions for balancing the vehicle. The system and method herein may be used in an electric vehicle as well as those run on fuel such as gasoline. The possibility of fitting the system herein within existing two-wheelers with minimal modifications further provides ease of wide spread adaptation.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope.

The invention claimed is:

1. A system for balancing a vehicle, the system comprising:
   at least one control moment gyroscope, configured to generate a precession-torque around a precession shaft, for affecting the balancing of the vehicle along a roll axis of the vehicle, having at least one flywheel spinnable in a first direction around a flywheel shaft, said at least one flywheel coupled to a precession shaft; and
   at least one stopper device coupled to the precession shaft, operable to lock the precession shaft from rotating around a precession axis that moves along the precession shaft, while said at least one flywheel is still spinning around a spin axis that moves along the flywheel shaft.

2. The system for balancing a vehicle as in claim 1, wherein said at least one stopper device is an electromechanical unit configured to engage with the precession shaft to stop the rotation of the precession shaft upon actuation of said at least one stopper device.

3. The system for balancing a vehicle as in claim 1, further comprising:
   a flywheel-position sensor coupled to the precession shaft to measure a precession angle of said at least one flywheel;
   an attitude sensor configured to measure changes in an attitude of the vehicle;
   a precession motor coupled to the precession shaft and operable to generate an actuation-torque along the precession axis;
   a control unit configured to operate the precession motor based at least upon, the precession angle of said at least one flywheel, and the attitude of the vehicle received from the attitude sensor.

4. The system for balancing a vehicle as in claim 3, further comprising:
   a vehicular-velocity sensor configured to measure a velocity of the vehicle; and
   wherein, the control unit is further configured to engage said at least one stopper device based at least upon the vehicular-velocity going above a threshold vehicular-velocity.

5. The system for balancing a vehicle as in claim 3, further comprising:
   a vehicular-velocity sensor configured to measure a velocity of the vehicle; and
   wherein, the control unit is further configured to disengage said at least one stopper device based at least upon the vehicular-velocity going below a threshold vehicular velocity.

6. The system for balancing a vehicle as in claim 3, further comprising:
   another control moment gyroscope, having another flywheel rotatable in a second direction opposite to the first direction, around another flywheel shaft, said another flywheel coupled to another precession shaft;
   wherein, the precession motor is coupled to said at least one precession shaft and said another precession shaft; and wherein, the flywheel-position sensor is configured to measure the precession angle of said at least one flywheel and said another flywheel, the flywheel-position sensor being coupled to said at least one precession shaft or said another precession shaft.

7. The system for balancing a vehicle as in claim 3, further comprising:
   another control moment gyroscope, having another flywheel rotatable in a second direction along another flywheel shaft, coupled to another precession shaft;
   a second precession motor coupled to said another precession shaft and operable to generate another actuation-torque along said another precession shaft;
   a second flywheel-position sensor coupled to said another precession shaft to measure a precession angle of said another flywheel.

8. The system for balancing a vehicle as in claim 3, further comprising a user input switch for operating the stopper device based on an action from user.

9. The system for balancing a vehicle as in claim 3, wherein the control unit is further configured to detect impact based on the attitude sensor output, and disengage said at least one stopper device.

10. The system for balancing a vehicle as in claim 3, wherein said at least one stopper device is integrated into the precession motor.

11. The system for balancing a vehicle as in claim 3, wherein the flywheel shaft and said at least one flywheel are integrated into a single unit.

12. The system for balancing a vehicle as in claim 3, wherein the flywheel-position sensor is integrated into the precession motor.

13. The system for balancing a vehicle as in claim 3, wherein the control unit is a part of another control unit located inside the vehicle which is responsible for other functions of the vehicle.

14. A method for balancing a vehicle, the method comprising:
   spinning at least one flywheel of a control moment gyroscope in a first direction, coupled to a precession shaft at least at a threshold flywheel-spin-velocity;
   generating a precession-torque for affecting the balancing of the vehicle along a roll axis of the vehicle; and
   operating at least one stopper device coupled to the precession shaft, configured to lock the precession shaft from rotating, based on a stopper-device-actuation signal, while said at least one flywheel is still spinning around a spin axis that moves along the flywheel shaft.

15. The method for balancing a vehicle as in claim 14, comprising:
   obtaining an attitude of the vehicle; obtaining a precession angle of said at least one flywheel;
   operating a precession motor based at least upon, the precession angle of said at least one flywheel, and the attitude of the vehicle.

16. The method for balancing a vehicle as in claim 14, comprising:
   generating the stopper-device-actuation signal, thus engaging the stopper device, based at least on the vehicular-velocity going above a threshold vehicular-velocity.

17. The method for balancing a vehicle as in claim 14, comprising:

degenerating the stopper-device-actuation signal, thus disengaging the stopper device, based at least on the vehicular-velocity going below a threshold vehicular-velocity.

18. The method for balancing a vehicle as in claim 14, comprising:
generating the stopper-device-actuation signal to engage said at least one stopper device upon receiving a user input based on user desire.

19. The method for balancing a vehicle as in claim 14, comprising:
degenerating the stopper-device-actuation signal to disengage said at least one stopper device upon receiving a user input based on user desire.

20. The method for balancing a vehicle as in claim 14, comprising:
operating another flywheel of another control moment gyroscope in a second direction opposite to the first direction, coupled to another precession shaft at least at a threshold flywheel-spin-velocity.

21. A wheeled vehicle with at least two wheels having self-balancing capabilities, comprising:
a precession shaft coupled to a frame of the vehicle;
at least one control moment gyroscope, configured to generate a precession-torque around a precession shaft, for affecting the balancing of the vehicle along a roll axis of the vehicle, having at least one flywheel spinnable in a first direction around a flywheel shaft, said at least one flywheel coupled to the precession shaft; and
at least one stopper device coupled to the precession shaft, operable to lock the precession shaft from rotating around a precession axis that runs along the precession shaft, while said at least one flywheel is still spinning around a spin axis that moves along the flywheel shaft.

22. The wheeled vehicle with at least two wheels having self-balancing capabilities as in claim 21, wherein said at least one stopper device is an electromechanical unit configured to engage with the precession shaft to stop the rotation of the precession shaft upon actuation of said at least one stopper device.

23. The wheeled vehicle with at least two wheels having self-balancing capabilities as in claim 21, further comprising:
a flywheel-position sensor coupled to the precession shaft to measure a precession angle of said at least one flywheel;
an attitude sensor configured to measure changes in attitude of the vehicle;
a precession motor coupled to the precession shaft and operable to generate a actuation-torque along the precession axis;
a control unit configured to operate the precession motor based at least upon, the precession angle of said at least one flywheel, and the attitude of the vehicle received from the attitude sensor.

24. The wheeled vehicle with at least two wheels having self-balancing capabilities as in claim 23, further comprising:
a vehicular-velocity sensor configured to measure a velocity of the vehicle; and
wherein, the control unit is further configured to engage said at least one stopper device based at least upon the vehicular-velocity going above a threshold vehicular-velocity.

25. The wheeled vehicle with at least two wheels having self-balancing capabilities as in claim 23, further comprising:
a vehicular-velocity sensor configured to measure a velocity of the vehicle; and
wherein, the control unit is further configured to disengage said at least one stopper device based at least upon the vehicular-velocity going below a threshold vehicular velocity.

26. The wheeled vehicle with at least two wheels having self-balancing capabilities as in claim 23, further comprising:
another control moment gyroscope, having another flywheel rotatable in a second direction opposite to the first direction, around another flywheel shaft, said another flywheel coupled to another precession shaft;
wherein, the precession motor is coupled to said at least one precession shaft and said another precession shaft; and
wherein, the flywheel-position sensor is configured to measure the precession angle of said at least one flywheel and said another flywheel, the flywheel-position sensor being coupled to said at least one precession shaft or said another precession shaft.

27. The wheeled vehicle with at least two wheels having self-balancing capabilities as in claim 23, further comprising:
another control moment gyroscope, having another flywheel rotatable in a second direction along another flywheel shaft, coupled to another precession shaft;
a second precession motor coupled to said another precession shaft and operable to generate another actuation-torque along said another precession shaft;
a second flywheel-position sensor coupled to said another precession shaft to measure a precession angle of said another flywheel.

28. The wheeled vehicle with at least two wheels having self-balancing capabilities as in claim 23, further comprising a user input switch for operating the stopper device based on an action from user.

29. The wheeled vehicle with at least two wheels having self-balancing capabilities as in claim 23, wherein the control unit is further configured to detect impact based on the attitude sensor output, and disengage said at least one stopper device.

30. The wheeled vehicle with at least two wheels having self-balancing capabilities as in claim 23, wherein said at least one stopper device is integrated into the precession motor.

31. The wheeled vehicle with at least two wheels having self-balancing capabilities as in claim 23, wherein the flywheel shaft and said at least one flywheel are integrated into a single unit.

32. The wheeled vehicle with at least two wheels having self-balancing capabilities as in claim 23, wherein the flywheel-position sensor is integrated into the precession motor.

33. The wheeled vehicle with at least two wheels having self-balancing capabilities as in claim 23, wherein the control unit is a part of another control unit located inside the vehicle which is responsible for other functions of the vehicle.

34. The wheeled vehicle with at least two wheels as in claim 23, further comprising a dashboard displaying to user the current status of balancing to allow the user take counter measures.

35. The wheeled vehicle with at least two wheels as in claim 23, wherein the control unit is further configured to deploy an automatic stand in case of a system failure wherein the vehicle comes to a halt.

36. The wheeled vehicle with at least two wheels as in claim 23, wherein the control unit is configured to receive input remotely for operating the vehicle.

37. The wheeled vehicle with at least two wheels as in claim 23, wherein the control unit is configured with onboard intelligence to operate the vehicle autonomously.

* * * * *